(12) United States Patent
Biondo et al.

(10) Patent No.: US 8,315,775 B2
(45) Date of Patent: Nov. 20, 2012

(54) CRUISE CONTROL SYSTEMS AND METHODS WITH ADAPTIVE SPEED ADJUSTMENT RATES

(75) Inventors: William A. Biondo, Beverly Hills, MI (US); David T. Proefke, Madison Heights, MI (US); Clark E. McCall, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 898 days.

(21) Appl. No.: 12/366,777

(22) Filed: Feb. 6, 2009

(65) Prior Publication Data
US 2010/0204896 A1 Aug. 12, 2010

(51) Int. Cl.
*B60T 8/32* (2006.01)
(52) U.S. Cl. ............ 701/93; 701/96; 701/200; 701/201; 701/207; 701/301; 340/426.19; 422/63; 180/170; 382/103
(58) Field of Classification Search .................... 701/93, 701/96, 200, 201, 207, 301; 342/33, 357.25; 340/426.19; 422/63; 180/170; 382/103
See application file for complete search history.

(56) References Cited

U.S. PATENT DOCUMENTS

| | | | | |
|---|---|---|---|---|
| 3,564,543 A | * | 2/1971 | Nehama et al. | 342/33 |
| 5,576,973 A | * | 11/1996 | Haddy | 342/357.25 |
| 2001/0018636 A1 | * | 8/2001 | Mizuno | 701/207 |
| 2002/0152018 A1 | * | 10/2002 | Duckeck | 701/201 |
| 2003/0044319 A1 | * | 3/2003 | Itoh | 422/63 |
| 2003/0093209 A1 | * | 5/2003 | Andersson et al. | 701/93 |
| 2004/0084237 A1 | * | 5/2004 | Petrie, Jr. | 180/170 |
| 2004/0257210 A1 | * | 12/2004 | Chen et al. | 340/426.19 |
| 2005/0000479 A1 | * | 1/2005 | Niki et al. | 123/90.15 |
| 2005/0165539 A1 | * | 7/2005 | Hahlweg et al. | 701/200 |
| 2005/0201590 A1 | * | 9/2005 | Kudo | 382/103 |
| 2005/0267684 A1 | * | 12/2005 | Kawakami et al. | 701/301 |
| 2006/0100769 A1 | * | 5/2006 | Arai et al. | 701/96 |

* cited by examiner

*Primary Examiner* — Mary Cheung
*Assistant Examiner* — Sanjeev Malhotra
(74) *Attorney, Agent, or Firm* — Ingrassia Fisher & Lorenz, P.C.

(57) ABSTRACT

Embodiments include methods and apparatus for performing cruise control in a motor vehicle. Signals are received (e.g., by a positioning system interface) from at least one external infrastructure component, and a geographical location of the motor vehicle is determined (e.g., by a processing and control subsystem) based on the signals. A determination is made whether a difference between a target speed and an actual vehicle speed exceeds a threshold and, when the difference exceeds the threshold, a cruise control procedure is performed to maintain a target speed of the motor vehicle. Performing the cruise control procedure includes determining, based on the geographical location, whether the motor vehicle should adjust its speed toward the target speed.

13 Claims, 3 Drawing Sheets

CRUISE CONTROL SYSTEMS AND METHODS WITH ADAPTIVE SPEED ADJUSTMENT RATES

TECHNICAL FIELD

Embodiments of systems and methods relate to cruise control systems in motor vehicles.

BACKGROUND

When activated, a cruise control system implemented in a motor vehicle automatically controls the vehicle's speed. Through a user interface of the cruise control system, the vehicle operator (i.e., the "driver") may activate the cruise control system, deactivate the cruise control system, and set or adjust a target speed for the vehicle. Once activated, the cruise control system compares the actual speed of the vehicle with the target speed, and controls the operation of the vehicle's speed in order to attempt to maintain the target speed.

For example, when the vehicle's actual speed is less than the target speed, the cruise control system may cause the vehicle to accelerate by providing throttle control signals to increase the throttle input (e.g., causing the throttle to increase air flow to the engine) and/or by providing transmission control signals to cause the vehicle's transmission to downshift. Alternatively, when the vehicle's actual speed is greater than the target speed, the cruise control system may cause the vehicle to decelerate by providing throttle control signals to decrease the throttle input (e.g., causing the throttle to decrease air flow to the engine) and/or by providing transmission control signals to cause the engine to perform engine braking (e.g., causing the transmission to downshift without increasing the throttle input). Once the cruise control system determines that the actual speed has reached the target speed, the cruise control system may operate the speed in a steady state matter in order to maintain the target speed.

Although conventional cruise control systems may be a great convenience to drivers, under some circumstances, conventional cruise control systems may operate in a manner that is inherently inefficient, in terms of fuel economy. For example, when a conventional cruise control system detects a fairly large difference between a vehicle's actual speed and a target speed (e.g., 5 miles/per hour (mph) or more), the cruise control system may cause the vehicle to accelerate aggressively in order to reach the target speed. This aggressive acceleration may be accomplished, for example, by causing the transmission to downshift and by causing a significant increase in the throttle input. A vehicle tends to consume more fuel while aggressively accelerating than while gradually accelerating and, accordingly, aggressive acceleration results in decreased fuel economy.

The inefficiencies in fuel economy due to aggressive acceleration are exacerbated in heavy traffic and other scenarios. For example, each time a vehicle operating with its cruise control system activated approaches slower traffic ahead of the vehicle, the driver must either apply the brake, deactivate the cruise control system or maneuver around the traffic in order to avoid a collision. When the driver repeatedly brakes and/or deactivates and re-activates the cruise control system, the cruise control system may cause the vehicle repeatedly to accelerate aggressively, thus adversely affecting the vehicle's fuel economy. Similar inefficiencies may occur in areas where the speed limits repeatedly change and in areas where the roads include non-gradual turns. In such areas, a driver may be forced repeatedly to brake, to re-set the target speed, and/or to deactivate and re-activate the cruise control system in order to comply with the speed limit restrictions or to maneuver around the turns. In addition to fuel economy issues, some drivers may find it tedious to repeatedly brake, re-set the target speed, and/or deactivate and reactivate the cruise control system.

Conventional cruise control systems also may result in relatively low fuel economy in areas of variable terrain (e.g., hilly areas). For example, gravity may cause a vehicle climbing a hill to slow down, which may induce the cruise control system to cause the vehicle aggressively to accelerate to the target speed during the climb (e.g., through downshifting and increased throttle input). After the vehicle reaches the crest of the hill and begins its descent, gravity may cause the vehicle's speed to increase beyond the target speed, which may induce the cruise control system to cause the vehicle to decelerate (e.g., through engine braking). Both the aggressive acceleration maneuver in the climb and the deceleration maneuver in the descent are inherently less fuel efficient than operating on flat terrain. When performed repeatedly (e.g., in areas where hills are numerous), significantly decreased fuel economy may result.

What are needed are cruise control systems and methods of their operation that may result in better fuel economy when compared with the fuel economies achieved using conventional cruise control systems. More particularly, what are needed are cruise control systems and methods that may result in improved fuel economy in areas of heavy traffic, variable speed limits, non-gradual turns, and/or uneven terrain. Other desirable features and characteristics will become apparent from the subsequent detailed description and the appended claims, taken in conjunction with the accompanying drawings and the foregoing technical field and background.

SUMMARY

An embodiment includes a method for performing cruise control in a motor vehicle. The method includes receiving signals from at least one external infrastructure component, and determining a geographical location of the motor vehicle based on the signals. In addition, the method includes determining whether a difference between a target speed and an actual vehicle speed exceeds a threshold and, when the difference exceeds the threshold, performing a cruise control procedure to maintain a target speed of the motor vehicle. Performing the cruise control procedure includes determining, based on the geographical location, whether the motor vehicle should adjust its speed toward the target speed.

Another embodiment of a method for performing cruise control in a motor vehicle includes performing a first cruise control procedure to maintain a target speed for the motor vehicle based on differences between the target speed and actual vehicle speeds of the motor vehicle, receiving information that indicates a feature of an environment external to the motor vehicle, and performing a second cruise control procedure to maintain the target speed based on the information and the differences between the target speed and the actual vehicle speeds. Performing the second cruise control procedure includes determining, based on a geographical location of the motor vehicle and the information, whether the motor vehicle should adjust its speed toward the target speed.

Yet another embodiment includes an apparatus for performing cruise control in a motor vehicle. The apparatus includes a positioning system interface adapted to receive signals from at least one external infrastructure component, and a processing and control subsystem. The processing and control system is adapted to determine a geographical location of the motor vehicle based on the signals, to determine whether a difference between a target speed and an actual vehicle speed exceeds a threshold, and when the difference exceeds the threshold, to perform a cruise control procedure to maintain a target speed of the motor vehicle based on the geographical location.

BRIEF DESCRIPTION OF THE DRAWINGS

Embodiments of the inventive subject matter will hereinafter be described in conjunction with the following drawing figures, wherein like numerals denote like elements.

DETAILED DESCRIPTION

The following detailed description is merely exemplary in nature and is not intended to limit the scope or the application and uses of the inventive subject matter. Furthermore, there is no intention to be bound by any expressed or implied theory presented in the preceding technical field, background, summary or the following detailed description. In the following description, like reference numbers relate to like elements in each of the Figures.

As used herein, the terms "cruise control" or "cruise control function" means a process of adjusting the speed of a motor vehicle based on a target speed set by a driver and actual speeds of the motor vehicle, where the process of adjusting the speed is performed automatically by a cruise control system of the motor vehicle. Embodiments of the inventive subject matter include cruise control systems and methods of their operation that may result in better fuel economy when compared with the fuel economies achieved using conventional cruise control systems. More particularly, embodiments include cruise control systems and methods that may result in improved fuel economy in areas of heavy traffic, variable speed limits, non-gradual turns, and/or uneven terrain.

Figure 1:
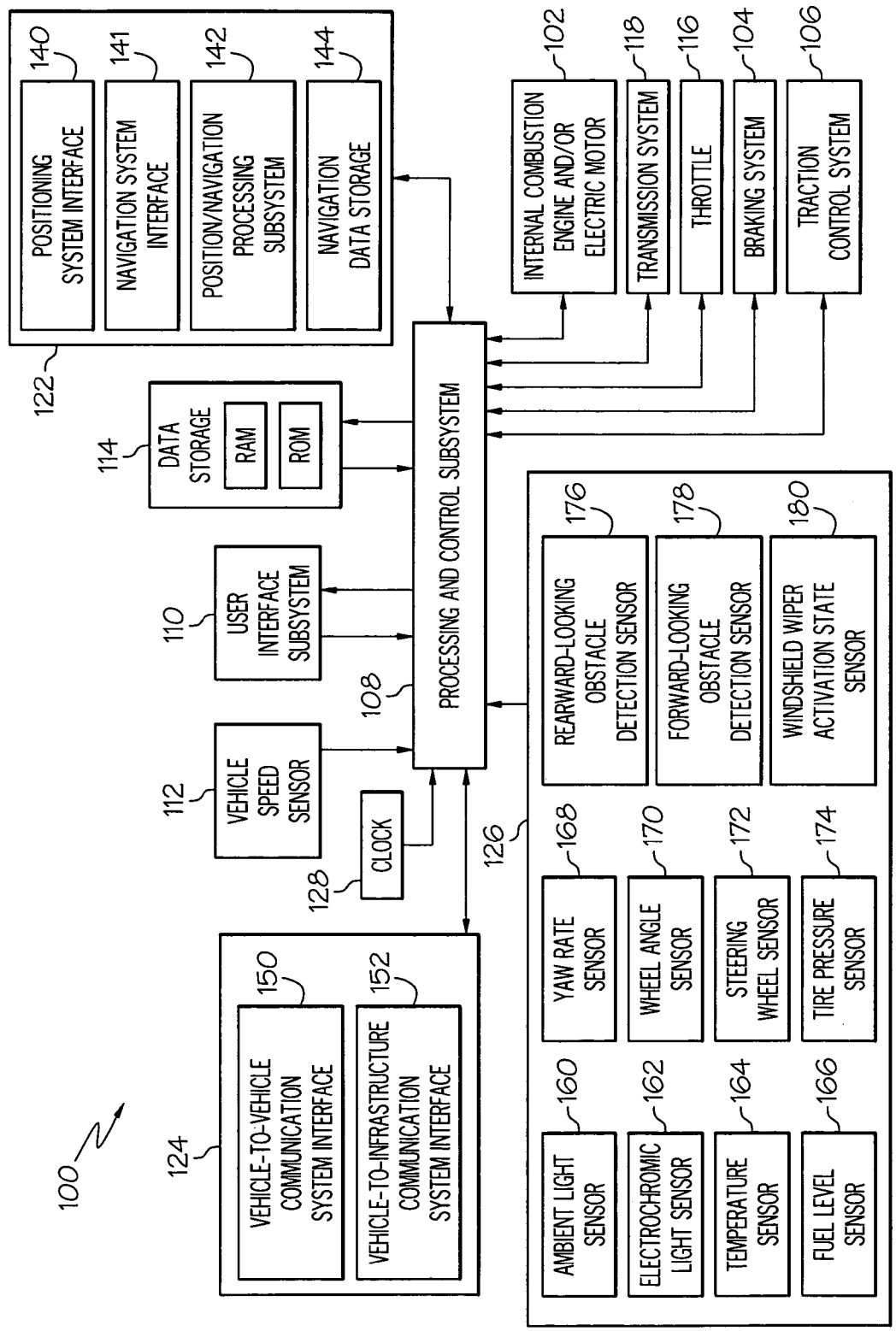
FIG. 1 is a simplified block diagram of a system adapted to provide a cruise control function in a motor vehicle, in accordance with an example embodiment.

FIG. 1 is a simplified block diagram of a system 100 adapted to provide a cruise control function in a motor vehicle, in accordance with an example embodiment. A motor vehicle into which system 100 may be incorporated may be any one of a number of different types of motor vehicles, including, for example, a conventional type of motor vehicle that includes an internal combustion engine (e.g., a gasoline or diesel fueled combustion engine, a gasoline/alcohol ("flex fuel") combustion engine, or a gaseous compound (e.g., hydrogen and natural gas) fueled engine), a hybrid-electric vehicle (e.g., a vehicle that includes an internal combustion engine and an electric motor to provide propulsion), or an all-electric vehicle (e.g., a vehicle that includes only an electric motor to provide propulsion).

System 100 includes internal combustion engine and/or electric motor 102 (depending on the type of motor vehicle), braking system 104, traction control system 106, processing and control subsystem 108, user interface subsystem 110, vehicle speed sensor 112, and data storage 114. In a vehicle that includes an internal combustion engine, system 100 also includes a throttle 116 and transmission system 118. According to various embodiments, system 100 also may include any one or more of position/navigation system 122, wireless interfaces 124, on-board sensors 126, and/or clock 128.

User interface subsystem 110 may include one or more buttons, levers, display devices, and/or other apparatus. Via these apparatus, user interface subsystem 110 is adapted to receive inputs from the operator of the motor vehicle (e.g., the driver) that indicate whether the driver desires the vehicle to activate or deactivate a cruise control function, and that indicate a target speed that the driver would like the vehicle to maintain while the cruise control function is activated. In addition, according to an embodiment, user interface subsystem 110 is adapted to prompt the driver regarding which of a plurality of cruise control procedures the driver desires the vehicle to implement, and to receive inputs from the driver indicating a selected cruise control procedure. As will be described in more detail later, and according to various embodiments, the plurality of cruise control procedures includes a first (e.g., "conventional") cruise control procedure and a second (e.g., "non-conventional") cruise control procedure. The second cruise control procedure is adapted to implement the cruise control function using a different set of inputs from those used by the first cruise control procedure, according to an embodiment. According to another embodiment, the second cruise control procedure is also or alternatively adapted to attempt to achieve a higher fuel economy than the fuel economy that may be achieved during implementation of the first cruise control procedure.

Vehicle speed sensor 112 is adapted to detect actual speeds of the vehicle in real time, and to produce information indicating the actual speeds. The actual speed information may be stored by vehicle speed sensor 112 in data storage 114 and/or provided directly to processing and control subsystem 108.

Data storage 114 may include various types of random access memory (RAM) and read only memory (ROM), which are adapted to store computer-readable instructions (e.g., program code) associated with one or more cruise control procedures, variable data (e.g., target speed settings, actual speeds, cruise control mode indications, and so on), and persistent data, among other things. The instructions and data may be accessed by processing and control subsystem 108 during performance of a cruise control procedure. In addition, processing and control subsystem 108 and/or other system components may store data in data storage 114 in conjunction with performing a cruise control procedure.

Processing and control subsystem 108 may include one or more automotive control modules, electronic control units, general-purpose and/or special-purpose processors, and/or associated electronics. Processing and control subsystem 108 is adapted to receive information from user interface subsystem 110 indicating activation of a cruise control function, deactivation of the cruise control function, and a target speed that the vehicle operator would like the vehicle to maintain while the cruise control function is being implemented. In addition, according to an embodiment, processing and control subsystem 108 is further adapted to receive indications regarding which of a plurality of cruise control procedures (e.g., first and second cruise control procedures) the driver has selected. Each of the plurality of cruise control procedures may be considered to be associated with a particular cruise control "mode" (e.g., first or second cruise control modes). In an alternate embodiment, processing and control subsystem 108 may be adapted to implement only a single cruise control procedure (e.g., to support a single cruise control mode).

Processing and control subsystem 108 is further adapted to receive the actual speed indications produced by vehicle speed sensor 112, to determine differences between a target speed (e.g., as indicated by the driver via the user interface subsystem 110) and the actual speeds, and to perform the cruise control procedure based on the differences. According to an embodiment, and as will be described in further detail below, processing and control subsystem 108 is further adapted to receive additional signals and/or information from the position/navigation system 122, wireless interfaces 124, on-board sensors 126, and/or clock 128, and to perform the cruise control procedure based on some or all of the additional signals and/or information.

In order to perform a cruise control procedure, processing and control subsystem 108 performs various determinations, as will be described in more detail below. Based on the determinations, processing and control subsystem 108 generates control signals that are provided to those system components that may affect the speed of the vehicle (e.g., that may cause the vehicle to adjust its speed by accelerating or decelerating). For example, processing and control subsystem 108 may provide control signals to any one or more of the internal combustion engine and/or electric motor 102, braking system 104, traction control system 106, throttle 116, and/or transmission system 118. Any one or more of these system components may provide feedback signals to processing and control subsystem 108.

Position/navigation system 122 is adapted to provide the functions of position determination (of the motor vehicle) and navigation, according to an embodiment. According to other embodiments, position/navigation system 122 may provide only position determination or navigation, but not both. In still other embodiments, system 100 may include separate subsystems to perform position determination and navigation. Position/navigation system 122 includes a positioning system interface 140, a navigation system interface 141, a position/navigation processing subsystem 142, and navigation data storage 144, according to an embodiment.

Positioning system interface 140 includes one or more antennas and receivers adapted to receive signals from at least one external infrastructure component of a positioning system that is external to the motor vehicle. According to an embodiment, the external infrastructure component may be a global positioning system (GPS) satellite (not illustrated), and accordingly positioning system interface 140 may be adapted to receive signals transmitted by one or more GPS satellites that may be used for the purpose of location determination. According to other embodiments, positioning system interface 140 may be adapted to receive signals from other types of terrestrial-based external infrastructure components, such as cellular telephone base stations or other terrestrial-based transmitters. As will be described in more detail below, the signals may be processed by position/navigation processing subsystem 142 in order to determine a geographical location of the motor vehicle.

Navigation system interface 141 is a wireless interface that includes one or more antennas and transceivers adapted to transmit signals to and receive signals from at least one navigation system that is external to the motor vehicle. According to an embodiment, transmitted signals may convey messages generated by position/navigation processing subsystem 142 relating to requests for navigation information (e.g., destination addresses, origination addresses, position information, search parameters, route determination parameters, and so on), and received signals may convey messages generated by the external navigation system in response to the requests or otherwise initiated by the external navigation system (e.g., maps, routes, address information, potential destination information, topographical information, information relating to the physical features of a roadway, information relating to traffic control devices and/or posted speed limits, information relating to transient anomalies, and so on). Position/navigation processing subsystem 142 may use some of the received signals in order to convey route information (e.g., via a display) to the driver. In addition, and as will be described in more detail below, position/navigation processing subsystem 142 and/or processing and control subsystem 108 may process the signals or information conveyed therein in conjunction with implementing a cruise control function.

Position/navigation processing subsystem 142 may be distinct from processing and control subsystem 108, according to an embodiment, although it may be integrally part of the processing and control subsystem 108, according to another embodiment. Position/navigation processing subsystem 142 may include one or more general-purpose and/or special-purpose processors, and/or associated electronics, and is adapted to analyze the signals received by positioning system interface 140 in order to determine a geographical location of the motor vehicle. According to an embodiment, geographical location determination is performed using a geometric trilateration technique, although other methods for determining a geographical location may be used, in other embodiments. Location determination using geometric trilateration is most accurately achieved when signals from three or more, spatially-separated external infrastructure components (e.g., three or more distinct GPS satellites) are receivable. However, the term "geometric trilateration technique" as used herein may also include performing location determination when signals from one or two external infrastructure components are available.

Navigation data storage 144 may be distinct from data storage 114, according to an embodiment, although some or all of navigation data storage 144 may be integrally part of data storage 114, according to another embodiment. Navigation data storage 144 may include various types of RAM and/or ROM, which are adapted to store information relating to features of a route which the motor vehicle is or may be following and potential source locations and destination locations. This information may include, for example, information defining roadways, traffic control features (e.g., stop lights, stop signs), speed limits, geographical boundaries, geographical entity names (e.g., state, city, street, street address), and/or business entity names, contact information, and entity type, among other things. In addition, according to various embodiments, navigation data storage 144 also or alternatively may store one or more other types of information, including information relating to features of proximate topography (e.g., elevations, elevation contours, landforms, locations of hill or mountain summits, locations of inflection points between hills, locations of edges of valleys, locations of edges of plateaus, and so on), physical features of a roadway (changes in curvature, turn radii, grades), locations of traffic control devices (including stop lights, stop signs, and posted speed limits), states and timing information relating to traffic control devices (e.g., traffic light states (e.g., red, yellow, green states) and timing information (e.g., projected times for state changes)), and information relating to transient anomalies transient anomalies and transient anomaly locations (e.g., construction zones, temporary speed limits, incident scenes (e.g., accident scenes, roadblocks, and so on), current weather related information (e.g., snow, rain, fog, roadway ice, temperature, and so on)), among other things. Some or all of this information alternatively may be stored elsewhere (e.g., in the RAM of data storage 114 or in an external location). According to an embodiment, navigation data storage 144 also may be adapted to store computer-readable instructions (e.g., program code) associated with the functions performed by position/navigation processing subsystem 142.

As will be explained in more detail later, processing and control subsystem 108 is adapted to receive and analyze the geographical location determined by position/navigation processing subsystem 142 and/or some or all of the information stored in navigation data storage 144. During times when the cruise control function is being implemented, processing and control subsystem 108 is further adapted to determine, based on the geographical location and/or the information, whether the motor vehicle is approaching a portion of a road over which the motor vehicle should travel at a slower speed than the target speed, according to various embodiments. When processing and control subsystem 108 determines that the motor vehicle is approaching such a portion of the road, processing and control subsystem 108 is further adapted to perform the cruise control procedure based on the geographical location and/or the information, as will be explained in more detail below.

Wireless interfaces 124 include one or more interfaces adapted to communicate wirelessly with a system that is external to the motor vehicle (other than a navigation system or positioning system). According to various embodiments, wireless interfaces 124 may include one or more interfaces selected from a group that includes a vehicle-to-vehicle communication system interface 150 and a vehicle-to-infrastructure communication system interface 152.

Vehicle-to-vehicle communication system interface 150 includes one or more antennas and transceivers adapted to transmit signals to and receive signals from one or more other motor vehicles proximate to the motor vehicle. According to an embodiment, transmitted signals may convey messages generated by processing and control subsystem 108 and/or position/navigation processing subsystem 142 relating to the motor vehicle's geographical location, current speed, target speed, direction of motion, and so on. In addition, transmitted signals may convey messages relating to requests for information from the other vehicle (e.g., the other vehicle's geographical location, current speed, target speed, direction of motion, and so on). Received signals may convey messages generated by the other vehicle in response to the requests or otherwise initiated by the other vehicle (e.g., the other vehicle's geographical location, current speed, target speed, direction of motion, and so on). According to an embodiment, and as described in more detail below, processing and control subsystem 108 may process the received signals or information conveyed therein in conjunction with implementing a cruise control function.

Vehicle-to-infrastructure communication system interface 152 includes one or more antennas and transceivers adapted to transmit signals to and receive signals from one or more external communication systems (e.g., cellular telephone systems, radio networks, satellite communication systems, and so on). According to an embodiment, transmitted signals may convey messages generated by processing and control subsystem 108 and/or position/navigation processing subsystem 142 relating to requests for information from the external communication system (e.g., information regarding transient anomalies, information accessible over the internet, and other information). Received signals may convey messages generated by the external communication system in response to the requests or otherwise initiated by the external communication system. According to an embodiment, and as described in more detail below, processing and control subsystem 108 may process the received signals or information conveyed therein in conjunction with implementing a cruise control function.

On-board sensors 126 include one or more sensors adapted to provide information to the processing and control subsystem 108 relating to the external environment and/or the state of a system or device of the motor vehicle. According to various embodiments, on-board sensors 126 may include one or more sensors selected from a group that includes an ambient light sensor 160, an electrochromic light sensor 162, a temperature sensor 164, a fuel level sensor 166, a yaw rate sensor 168, a wheel angle sensor 170, a steering wheel sensor 172, a tire pressure sensor 174, a rearward-looking obstacle detection sensor 176, a forward-looking obstacle detection sensor 178, and a windshield wiper activation state sensor 180.

Ambient light sensor 160, electrochromic light sensor 162, and temperature sensor 164 are adapted to detect characteristics of the environment external to the motor vehicle, and to provide information defining the detected characteristics to the processing and control subsystem 108. More particularly, ambient light sensor 160 may include a light detection component positioned on an exterior of the motor vehicle that is adapted to detect the level of ambient light of the environment external to the vehicle, and to generate information defining the detected level of ambient light. Electrochromic light sensor 162 may include an electrochromic material within a rear-view mirror, which modulates an amount of light that passes through the material based on the intensity of the light impinging upon the material. Accordingly, electrochromic light sensor 162 may be adapted to detect and produce information indicating a potential presence of another vehicle located behind the motor vehicle when light from the headlights of the other vehicle impinges upon the electrochromic material within the rear-view mirror. Electrochromic light sensor 162 also may be adapted to detect and produce information indicating the level of ambient light of the interior and/or exterior of the motor vehicle. Temperature sensor 164 is adapted to detect the ambient temperature of the environment external to the motor vehicle, and to produce information indicating the ambient temperature. As will be described in more detail later, the information produced by ambient light sensor 160, electrochromic light sensor 162, and/or temperature sensor 164 may be used by processing and control system 108 in conjunction with implementing a cruise control function, according to various embodiments.

Fuel level sensor 166, yaw rate sensor 168, wheel angle sensor 170, steering wheel sensor 172, tire pressure sensor 174, and windshield wiper activation state sensor 180 are adapted to detect characteristics of various systems or devices of the motor vehicle, and to provide information defining the detected characteristics to the processing and control subsystem 108. More particularly, fuel level sensor 166 is adapted to detect a level of fuel in the motor vehicle's fuel tank (or tanks), and to generate information defining the detected fuel levels. Tire pressure sensor 174 is adapted to detect the air pressures within one or more of the motor vehicle's tires, and to generate information defining the detected air pressures. Windshield wiper activation state sensor 180 is adapted to determine the activation state of the motor vehicle's windshield wiper motors, and to generate information indicating the determined activation state. As will be described in more detail later, the information produced by fuel level sensor 166, tire pressure sensor 174, and/or windshield wiper activation state sensor 180 may be used by processing and control system 108 in conjunction with implementing a cruise control function, according to various embodiments.

Yaw rate sensor 168 includes a gyroscopic device adapted to measure the motor vehicle's angular velocity around its vertical axis, and to provide information defining the detected angular velocity to the processing and control subsystem 108. Wheel angle sensor 170 includes a device adapted to measure the rotation angle of one or more of the motor vehicle's wheels, and to provide information defining the detected angles to the processing and control subsystem 108. Steering wheel sensor 172 includes a device adapted to measure the rotation angle of the motor vehicle's steering wheel, and to provide information defining the detected angle to the processing and control system 108. As will be described in more detail later, the information produced by yaw rate sensor 168, wheel angle sensor 170, and/or steering wheel sensor 172 may be evaluated by an electronic stability control function implemented by processing and control system 108 in order to detect and correct for loss of steering control (e.g., during a skid). In addition, this information may be used by processing and control system 108 in conjunction with implementing a cruise control function, according to various embodiments.

Rearward-looking obstacle detection sensor 176 and forward-looking obstacle detection sensor 178 are adapted to detect the presence of obstacles behind and in front of the motor vehicle, respectively, and also to detect the distance between the motor vehicle and the detected obstacle. Rearward-looking obstacle detection sensor 176 and forward-looking obstacle detection sensor 178 also may be adapted to determine the relative velocity of an obstacle (e.g., another vehicle) with respect to the motor vehicle. Rearward-looking obstacle detection sensor 176 and forward-looking obstacle detection sensor 178 are also adapted to provide information indicating or defining the presence of obstacles, the distances to the detected obstacles, and/or the relative velocity of the obstacles to the processing and control subsystem 108. As will be described in more detail later, the information produced by the rearward-looking obstacle detection sensor 176 and/or the forward-looking obstacle detection sensor 178 may be used by processing and control system 108 in conjunction with implementing a cruise control function, according to various embodiments.

Clock 128 includes an analog or digital device adapted to maintain and/or to determine knowledge of a current time, and to provide information defining the current time to the processing and control subsystem 108. As will be described in more detail later, the information produced by clock 128 may be used by processing and control system 108 in conjunction with implementing a cruise control function, according to an embodiment.

Figure 2:
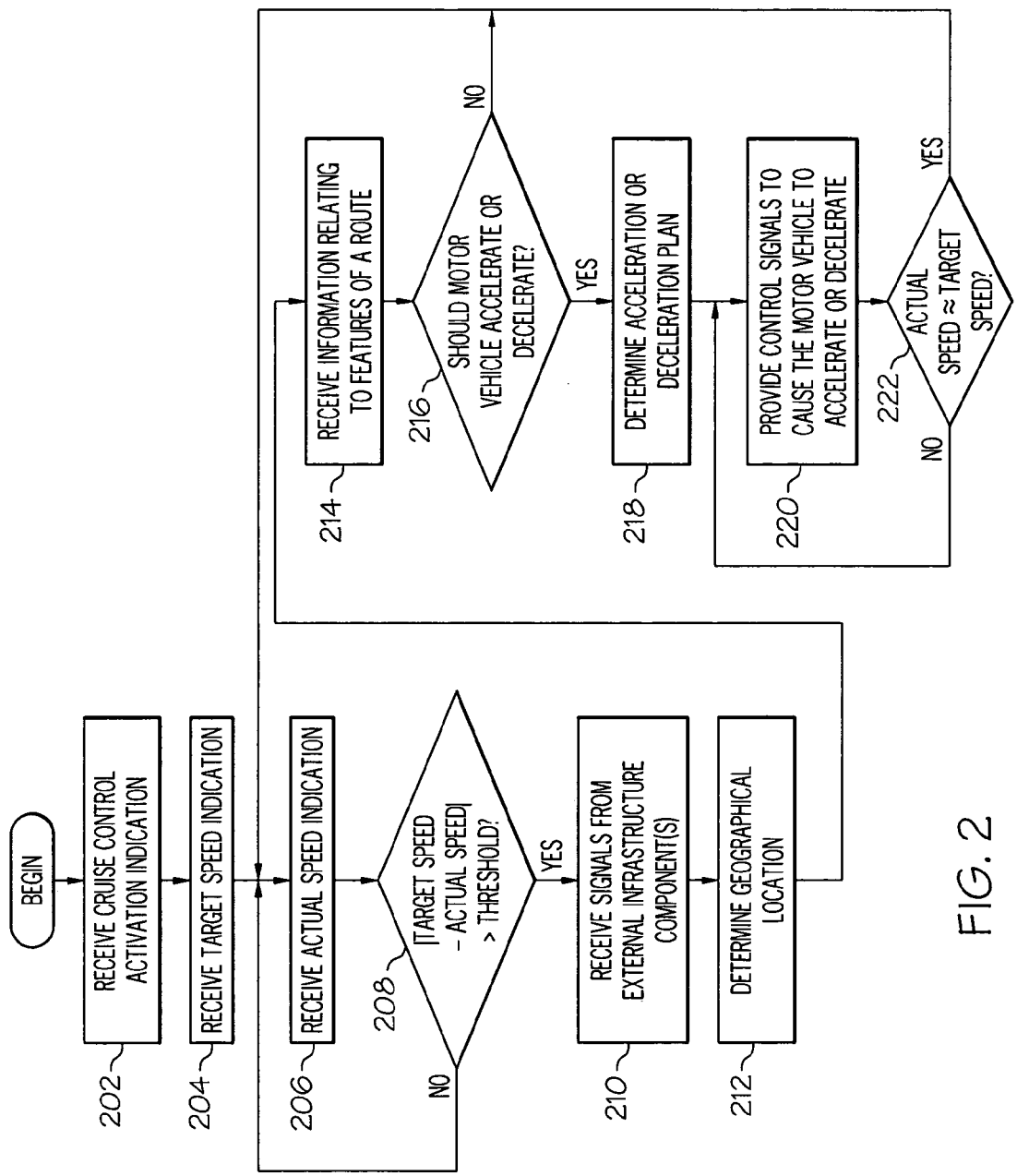
FIG. 2 is a flowchart of a method for performing cruise control in a motor vehicle, in accordance with an embodiment.

FIG. 2 is a flowchart of a method for performing cruise control in a motor vehicle, in accordance with an embodiment. In the embodiment described in conjunction with FIG. 2, and as will be described in more detail below, the method includes considering the geographical location of the motor vehicle in conjunction with performing cruise control. In addition, in various embodiments, the method also may include considering information from one or more other non-conventional inputs in conjunction with performing cruise control.

The method may begin, in block 202, when an indication that the cruise control function should be activated is received (e.g., by a processing and control subsystem, such as processing and control subsystem 108, FIG. 1). According to an embodiment, the indication may be produced by a user interface subsystem (e.g., user interface subsystem 110, FIG. 1) in response to the manipulation, by the driver, of one or more apparatus associated with the user interface subsystem. For example, but not by way of limitation, the driver may depress a button designated for activating the cruise control function. According to an embodiment, and as will be described in more detail in conjunction with FIG. 3, the cruise control system may be adapted to provide multiple cruise control "modes," where different cruise control procedures are performed in conjunction with each different mode. Embodiments of methods for providing for selection of different cruise control modes are described in more detail in conjunction with FIG. 3. Although processes associated with selecting a cruise control mode are not illustrated or discussed in conjunction with FIG. 2, it is to be understood that embodiments of the method of FIG. 2 may include such processes, and an embodiment of the method for performing cruise control illustrated and described in conjunction with FIG. 2 may be considered to be associated with one of multiple, selectable cruise control modes.

In block 204, an indication of a target speed may be received (e.g., by the processing and control subsystem), and a value representing the target speed may be stored (e.g., in the RAM of data storage 114, FIG. 1). According to an embodiment, the indication may be produced by the user interface subsystem in response to additional manipulation, by the driver, of one or more apparatus associated with the user interface subsystem. For example, but not by way of limitation, the driver may cause the motor vehicle to attain a particular speed, and may depress a lever, which causes the user interface subsystem to produce an indication of the target speed as being equal to the particular speed attained. Alternatively, the user interface subsystem may be adapted to enable the user interface to input a value for the target speed that is different from the current speed of the motor vehicle. It is to be understood that, once the cruise control function is activated, a driver may set the target speed to an initial target speed, and then may reset the target speed to a different speed at a future time. When the target speed is reset by the driver, a value representing the new target speed may be stored. Process steps described below will utilize the most-recently stored target speed value.

In block 206, an indication of an actual vehicle speed (or "actual speed") may be received (e.g., by the processing and control subsystem), and a value representing the actual speed may be stored (e.g., in the RAM of data storage 114, FIG. 1). According to an embodiment, the indication may be produced by a vehicle speed sensor (e.g., vehicle speed sensor 112, FIG. 1). The actual speed represents a real-time measurement of the forward speed of the motor vehicle at a given instant, and the vehicle speed sensor may produce indications of the actual speed periodically (e.g., once every second) or aperiodically (e.g., when the actual vehicle speed changes by a predetermined amount). Each time an indication of a different actual speed is received, a value representing the new actual speed may be stored. Process steps described below will utilize the most-recently stored actual speed value.

In block 208, a determination is made (e.g., by the processing and control subsystem) whether a difference between the target speed and the actual speed exceeds a threshold (i.e., whether the absolute value of (target speed−actual speed) >threshold). The threshold may be a non-variable, pre-set value, according to an embodiment, or the threshold may be a value that is related (e.g., linearly) to the target speed. Although only a single threshold is described herein, it is to be understood that, in an alternate embodiment, a first threshold may be used for instances when the actual speed is greater than the target speed, and a second, different threshold may be used for instances when the actual speed is less than the target speed. According to an embodiment, the threshold is a value in a range of about 0.1 miles per hour (mph) to about 5 mph, with a threshold in a range of about 2 mph to about 4 mph being preferred. According to other embodiments, the threshold may be larger or smaller than the above-given ranges. In still other embodiments, the threshold may be different depending on the target speed (e.g., smaller thresholds may be used for lower target speeds, and higher thresholds may be used for higher target speeds). It is to be understood that the greater than (>) comparison operator is not to be considered as limiting. In alternate embodiments, a greater than or equal to comparison may be made, or the determination may include determining whether a difference between the target speed and the actual speed is less than (or less than or equal to) a threshold. In the latter case, the "YES" and "NO" decision branches illustrated in FIG. 2 would be reversed.

When a determination is made that the difference between the target speed and the actual speed does not exceed the threshold, then the method may iterate as shown. When a determination is made that the difference does exceed the threshold, then a process is performed to control the actual speed of the motor vehicle, as will be described in conjunction with blocks 210-222, below. As will be described in more detail below, the process for performing the cruise control procedure attempts to control the actual speed of the motor vehicle based on a geographical location of the motor vehicle, among other things.

In block 210, signals are received from at least one external infrastructure component. The signals may be received by a receiver of a positioning system interface (e.g., positioning system interface 140, FIG. 1), for example. The received signals enable a position processing subsystem (e.g., position/navigation processing subsystem 142 or processing and control subsystem 108, FIG. 1) to determine a geographical location of the motor vehicle, as will be described in more detail below. According to an embodiment, the at least one external infrastructure component includes at least one global positioning system satellite, and the signals include microwave signals transmitted by transmitters of the global positioning system satellite(s). The transmitted signals may include messages indicating the times when the signals were transmitted and orbital information (e.g., an ephemeris), among other things. In an alternate embodiment, the at least one external infrastructure component includes at least one terrestrial-based infrastructure component (e.g., a cellular telephone base station or other fixed-position transmitter), and the signals include microwave signals transmitted by transmitters of the terrestrial-based infrastructure component. These signals may include messages indicating the times when the signals were transmitted and position information indicating coordinates of the transmitter's position.

In block 212, a geographical location of the motor vehicle is determined based on the received signals. This determination may be made, for example, by the position processing subsystem. According to an embodiment, geometric trilateration is used to determine the geographical location. In such an embodiment, a distance may be determined between the location of the motor vehicle (or more particularly, the positioning system interface receiver) and the positions of each of the external infrastructure components from which the motor vehicle received signals. According to an embodiment, the position processing system maintains a clock that is synchronized with the clocks of the external infrastructure components. Each distance may be determined, for example, by measuring the transit time of each message and computing the distance to each external infrastructure component (e.g., each satellite). The geographical location of the motor vehicle may then be determined by combining the distances with the location of the external infrastructure components (e.g., the satellites) to determine the geographical location of the motor vehicle (or more particularly, the location of the positioning system interface receiver). In alternate embodiments, methods other than geometric trilateration may be used to determine the geographical location. For example, but not by way of limitation, the geographical location may be determined using a multilateration technique, a triangulation technique, or another position-determination technique.

In block 214, information relating to features of a route which the motor vehicle is following and/or features of an environment external to the motor vehicle may be received and/or retrieved by the processing and control subsystem, according to an embodiment. Retrieved information may be retrieved from local memory (e.g., from the RAM of data storage 114 or from navigation data storage 144, FIG. 1) or from an external source. External sources may include, for example, the internet, other networks, and/or other vehicles. Information from the internet or other networks may be retrieved using a vehicle-to-infrastructure communication system interface (e.g., vehicle-to-infrastructure communication system interface 152, FIG. 1), and/or a navigation system interface (e.g., navigation system interface 141, FIG. 1), according to various embodiments. In addition or alternatively, information from other vehicles may be received or retrieved using a vehicle-to-vehicle communication system interface (e.g., vehicle-to-vehicle communication system interface 150, FIG. 1).

In an embodiment, information relating to features of a route may include features of a previously planned route or other potential routes that are proximate to the motor vehicle's location. More particularly, this information may include, but is not limited to, one or more types of information selected from a group that includes information relating to features of proximate topography, physical features of a roadway, locations of traffic control devices, states and timing information relating to traffic control devices, information relating to transient anomalies, and transient anomaly locations, among other things. Information relating to features of a route also may include information relating to other vehicles proximate to the motor vehicle. Information relating to another vehicle may include, for example, an indication of the presence of the other vehicle, the geographical location of the other vehicle, the relative location of the other vehicle (e.g., ahead or behind), the distance between the motor vehicle and the other vehicle, and the speed of the other vehicle, among other things. As mentioned above, this information may be received using a vehicle-to-vehicle communication system interface. In addition or alternatively, some or all of this information may be determined using information from a rearward-looking obstacle detection sensor, a forward-looking obstacle detection sensor, or an electrochromic light sensor (e.g., sensors 176, 178, 162, FIG. 1).

In block 216, a determination is made (e.g., by the processing and control subsystem) whether the vehicle should accelerate (i.e., when the actual speed is less than the target speed) or decelerate (i.e., when the actual speed is greater than the target speed). According to an embodiment, this determination is made based on the geographical location of the motor vehicle and some or all of the information relating to features of the route which the motor vehicle is following (or potentially may follow). More particularly, with regard to determining whether or not the motor vehicle should accelerate, a determination is made whether the motor vehicle is approaching a feature of the route that may cause the motor vehicle to accelerate due to the force of gravity or whether a feature of the route is present that warrants a slower speed than the target speed. With regard to determining whether or not the motor vehicle should decelerate, a determination is made whether the motor vehicle is approaching a feature of the route that may cause the motor vehicle to decelerate due to the force of gravity or whether a feature of the route is present that warrants avoiding a deceleration maneuver.

As used herein, the term "the motor vehicle is approaching a feature" means that the motor vehicle is traveling along a roadway in a direction toward the feature, and the geographical location of the motor vehicle is within a pre-determined distance from the feature. The determination of the distance of the motor vehicle from the feature may be made, for example, by the processing and control subsystem based on the determined geographical location of the motor vehicle. The "pre-determined distance" between the motor vehicle and the feature may depend on the speed of the motor vehicle, the type of feature, and/or characteristics of the feature, among other things. According to an embodiment, the pre-determined distance is a distance in a range of about 20 meters to about 1000 meters, although the pre-determined distance may be shorter or longer, in other embodiments. A determination of whether or not the motor vehicle should accelerate toward the target speed may be made based on any one or more of the following sub-determinations, according to an embodiment:

1) Whether a comparison between the geographical location and the features of the route indicates that the motor vehicle is approaching a declining portion of the road (e.g., the motor vehicle is approaching a crest of a hill or an edge of a terrain feature that has a declining transition into the terrain feature). Information used in making this determination may include, for example, information defining a previously planned route or other potential routes that are proximate to the motor vehicle's location, information relating to features of proximate topography, and/or physical features of a roadway. This information may be received or retrieved, for example, from local data storage (e.g., data storage 114 and/or navigation data storage 144, FIG. 1), via a vehicle-to-infrastructure communication system interface (e.g., vehicle-to-infrastructure communication system interface 152, FIG. 1), and/or via a navigation system interface (e.g., navigation system interface 141, FIG. 1); and/or 2) Whether a comparison between the geographical location and the features of the route indicates that the motor vehicle is approaching a portion of a road over which the motor vehicle should travel at a lower speed than the target speed. For example, but not by way of limitation, portions of a road over which the motor vehicle should travel at a lower speed than the target speed may include, but are not limited to a portion of a road having a posted speed limit that is slower than the target speed, a stop sign, a traffic light which is projected to be red (based on knowledge of the traffic light state and/or state timing information) when the motor vehicle will be proximate to the traffic light, a portion of the road at which a transient anomaly is present (e.g., a construction zone, a temporary speed limit that is lower than the target speed, or an incident scene (e.g., an accident scene, roadblock, and so on)), a portion of a road having a turn or a curve with a curve radius that is less than a threshold, and a portion of a road having a weather-related anomaly that warrants traveling at a speed that is lower than the target speed (e.g., there is snow, sleet, rain, fog, roadway ice or an excessively cold or hot temperature), among other things. Information used in making this determination may include, for example, information defining physical features of a roadway, speed limit information, locations of traffic control devices, states and timing information relating to traffic control devices, information relating to transient anomalies, and transient anomaly locations. This information may be received or retrieved, for example, from local data storage (e.g., data storage 114 and/or navigation data storage 144, FIG. 1), via a vehicle-to-infrastructure communication system interface (e.g., vehicle-to-infrastructure communication system interface 152, FIG. 1), and/or via a navigation system interface (e.g., navigation system interface 141, FIG. 1); and/or 3) Whether a comparison between the geographical location and information relating to another vehicle indicates that the other vehicle is located ahead of the motor vehicle within a pre-determined distance (e.g., a distance between about 10 meters and about 300 meters), and whether further determinations indicate that the other vehicle is traveling along the same route and in the same direction as the motor vehicle, and the other vehicle is traveling at an equal or slower speed than the motor vehicle. Information used in making this determination may include, for example, the geographical location of the other vehicle, the distance between the motor vehicle and the other vehicle, and the speed of the other vehicle. This information may be received or retrieved, for example, from a forward-looking obstacle detection sensor (e.g., sensor 178, FIG. 1), and/or via a vehicle-to-vehicle communication system interface (e.g., interface 150, FIG. 1).

A determination of whether or not the motor vehicle should decelerate toward the target speed may be made based on any one or more of the following sub-determinations, according to an embodiment:

1) Whether a comparison between the geographical location and the features of the route indicates that the motor vehicle is approaching an inclining portion of the road (e.g., the motor vehicle is approaching an edge of a terrain feature that has an inclining transition into the terrain feature). Information used in making this determination may include some or all of the same types of information discussed in conjunction with the aggressive acceleration determination, above, and may be similarly received or retrieved; and/or 2) Whether a comparison between the geographical location and information relating to another vehicle indicates that the other vehicle is located behind the motor vehicle within a pre-determined distance (e.g., a distance between about 10 meters and about 300 meters), and whether further determinations indicate that the other vehicle is traveling along the same route and in the same direction as the motor vehicle, and the other vehicle is traveling at an equal or slower speed than the motor vehicle. Information used in making this determination may include, for example, the geographical location of the other vehicle, the distance between the motor vehicle and the other vehicle, and the speed of the other vehicle. This information may be received or retrieved, for example, from local data storage (e.g., data storage 114 and/or navigation data storage 144, FIG. 1), from a rearward-looking obstacle detection sensor (e.g., sensor 176, FIG. 1), from an electrochromic light sensor (e.g., sensor 162, FIG. 1), and/or via a vehicle-to-vehicle communication system interface (e.g., interface 150, FIG. 1).

As discussed previously in conjunction with FIG. 1, information produced by one or more additional sensors may be used in various embodiments of methods and apparatus for performing cruise control. These additional sensors may sense information relating to features of an environment external to the motor vehicle and/or characteristics of one or more motor vehicle devices or systems. According to various embodiments, these sensors may include any one or more sensors selected from a group that includes, but is not limited to, an ambient light sensor 160, a temperature sensor 164, a fuel level sensor 166, a yaw rate sensor 168, a wheel angle sensor 170, a steering wheel sensor 172, a tire pressure sensor 174, and a windshield wiper activation state sensor 180.

According to various embodiments, the occurrence of any one or more of the following may be factors against acceleration and/or deceleration in the decisions of whether or not to accelerate or decelerate:

1) When ambient light sensor 160 produces an indication that the motor vehicle is in an environment in which the ambient light is reduced from daylight lighting conditions (e.g., twilight, nighttime, cloudy weather, in a tunnel, and so on); and/or
2) When temperature sensor 164 produces an indication that the outside temperature is at or below freezing (e.g., 32 degrees Fahrenheit); and/or
3) When fuel level sensor 166 produces an indication of a low fuel level (e.g., less than ¼ of a tank or some other level); and/or
4) When yaw rate sensor 168, wheel angle sensor 170, and/or steering wheel sensor 172 produce information that indicates a loss of steering control and/or that the motor vehicle is in a relatively sharp turn; and/or
5) When tire pressure sensor 174 indicates that the air pressure of one or more of the vehicle's tires is lower than a threshold; and/or
6) When windshield wiper activation state sensor 180 produces an indication that the windshield wipers have been activated (this indicating that the motor vehicle is in an area of precipitation).

It is to be understood that one or more of the above determinations regarding acceleration and/or deceleration may not be made, in various embodiments. In addition, various alternate embodiments, determinations may be made only regarding whether or not to accelerate or only regarding whether or not to decelerate, but not both.

For the set of determinations that is made in conjunction with determining whether the motor vehicle should or should not adjust its speed (i.e., accelerate or decelerate), when all of the determinations yield a negative determination (i.e., a "NO" result), a determination is made that the motor vehicle should adjust its speed (i.e., the motor vehicle should accelerate toward the target speed (when the actual speed is less than the target speed) or decelerate toward the target speed (when the actual speed is greater than the target speed)). In another embodiment, each negative determination may be weighted in the decision of whether or not the motor vehicle should adjust its speed.

Referring back to block 116 and the above description, for the set of determinations that is made in conjunction with determining whether the motor vehicle should or should not adjust its speed, when one or more of the above determinations yields a positive determination (i.e., a "YES" result), a determination is made that the motor vehicle should not adjust its speed (i.e., the motor vehicle should not accelerate or decelerate toward the target speed). In another embodiment, each positive determination may be weighted in the decision of whether or not the motor vehicle should adjust its speed.

According to an embodiment, the cruise control system may attempt to accelerate or decelerate according to an acceleration or deceleration plan (referred to generally as a "speed adjustment plan"). Accordingly, when a determination is made that the motor vehicle should accelerate or decelerate toward the target speed, then in block 218, an acceleration or deceleration plan is determined, according to an embodiment. An acceleration or deceleration plan may include, for example, information relating to a target rate of acceleration or deceleration (referred to generally as a "target speed adjustment rate") and/or a set of vehicle subsystems that will be controlled to implement the acceleration or deceleration (e.g., one or more subsystems selected from a group that includes the engine, motor, transmission, throttle, brakes, and so on).

According to an embodiment, the speed adjustment plan (e.g., the acceleration or deceleration plan) may be determined based on various information. For example, but not by way of limitation, a target speed adjustment rate (e.g., a target rate of acceleration or deceleration) may be determined based on a current speed of the vehicle, a distance between the geographical location of the vehicle (e.g., as determined in block 212) and an upcoming feature of a route (e.g., information received in block 214), the type or nature of an upcoming feature of a route, the presence or absence of other proximate vehicles, the distance, direction, and/or speed of other proximate vehicles, information defining a previously planned route or other potential routes that are proximate to the motor vehicle's location, information relating to a desired fuel economy, and/or information produced by one or sensors, which may sense information relating to features of an environment external to the motor vehicle and/or characteristics of one or more motor vehicle devices or systems, among other things. This information may be received or retrieved in manners described elsewhere herein.

According to an embodiment, a target speed adjustment rate may be determined to be a target rate within a range of about 0.5 miles/per hour/per second (m/h/s) to about 10 m/h/s, according to an embodiment, although the cruise control system may determine target speed adjustment rates within ranges having lower or higher bounds, in other embodiments. For example, according to another embodiment, a range of target speed adjustment rates may include zero m/h/s, which may be equivalent to making a determination that the motor vehicle should not accelerate or decelerate. Acceleration or deceleration rates having values closer to zero may be considered to be relatively "less aggressive," and acceleration or deceleration rates having values toward the higher end of the range may be considered to be relatively "more aggressive." According to yet another embodiment, a range of target speed adjustment rates may include a range of negative and positive values (e.g., −10 m/h/s to +10 m/h/s), where negative values correspond to deceleration rates, zero corresponds to no speed adjustment, and positive values correspond to acceleration rates. Because the speed adjustment rate may be determined contemporaneously with the operation of the motor vehicle, the speed adjustment rate may be considered to be "adaptive," where the term "adaptive" means capable of being selected based on information that may vary during operation of the motor vehicle (e.g., based on variable information such as the geographical location, current speed, upcoming features of a route, proximate vehicles, and so on).

The following example relating to determining a target rate of deceleration is not intended to be limiting, but instead is provided to enhance understanding of several embodiments. When a determination has been made that the motor vehicle should decelerate, and another vehicle is traveling in the same direction behind the motor vehicle and at an equal or faster speed, a target rate of deceleration (e.g., within the above-given range) may be determined based on the distance between the motor vehicle and the other, rearward motor vehicle and/or the speed of the other motor vehicle. When the distance is relatively short and/or the other motor vehicle is traveling significantly faster, then a less aggressive rate of deceleration may be determined (e.g., toward the low end of the range). In contrast, when the distance is relatively far and/or the other motor vehicle is traveling slower, then a more aggressive rate of deceleration may be determined (e.g., toward the high end of the range). Implementing the above process may improve safety when a rapid deceleration maneuver is avoided in the presence of another, rearward motor vehicle traveling relatively closely and/or traveling at a significantly higher speed than the motor vehicle. Other compelling reasons for selecting a rate of acceleration or deceleration based on information listed above may exist, as well. In an alternate embodiment, however, the rate of acceleration and/or deceleration may be determined based solely on the difference between the current speed and the target speed, without factoring in the types of information listed in the previous paragraph.

Determining a set of vehicle subsystems that will be controlled to implement the acceleration or deceleration may be performed based on the determined rate of acceleration or deceleration. For example, less aggressive rates of acceleration or deceleration may be achieved by altering control of the throttle only, while more aggressive rates of acceleration or deceleration may be achieved by altering control of the throttle and the transmission system.

When a determination has been made that the motor vehicle should accelerate toward the target speed (e.g., in block 216), then in block 220, control signals are provided (e.g., by the processing and control subsystem) to one or more vehicle components to cause the motor vehicle to accelerate (e.g., according to a plan determined in block 218). For example, in order to perform an acceleration maneuver in a motor vehicle that includes an internal combustion engine (e.g., internal combustion engine 102, FIG. 1), a transmission system (e.g., transmission system 118, FIG. 1), and a throttle (e.g., throttle 116, FIG. 1), providing the control signals may include providing a transmission control signal that causes the transmission to downshift to a lower gear, and/or providing a throttle control signal that causes the throttle to increase airflow to the engine. In a motor vehicle that also or alternatively includes an electric motor (e.g., electric motor 102, FIG. 1), providing the control signals may include providing an inverter control signal that causes the electric motor to produce more torque.

Alternatively, when a determination has been made that the motor vehicle should decelerate toward the target speed (e.g., in block 216), then in block 220, control signals are provided (e.g., by the processing and control subsystem) to one or more vehicle components to cause the motor vehicle to decelerate (e.g., according to a plan determined in block 218). For example, in order to perform a deceleration maneuver in a motor vehicle that includes an internal combustion engine, a transmission system, and a throttle, providing the control signals may include providing control signals associated with engine braking. This may include, for example, providing a throttle control signal that causes the throttle to decrease airflow to the engine. When the transmission is not in neutral, and the driveshaft and the clutch are engaged, engine drag may cause the motor vehicle to decelerate. Providing the control signals also may include providing a transmission control signal that causes the transmission to downshift to a lower gear, thus providing more aggressive engine braking. In a motor vehicle that also includes an electric motor (e.g., a hybrid electric vehicle), providing the control signals may include providing control signals that simulate engine braking, and/or providing control signals that cause the internal combustion engine to waste energy, thus preventing the battery from becoming overcharged.

In block 222, a determination is made whether the actual speed approximately equals (≈) the target speed. If not, the method iterates as shown (i.e., control signals continue to be provided to cause the motor vehicle to continue to accelerate or decelerate toward the target speed). When a determination is made that the actual speed does approximately equal the target speed, then the method returns to block 206 and iterates as shown.

Referring back to block 116 and the above description, for the set of determinations that is made in conjunction with determining whether the motor vehicle should or should not adjust its speed, when one or more of the above determinations yields a positive determination (i.e., a "YES" result), a determination is made that the motor vehicle should not adjust its speed (i.e., the motor vehicle should not accelerate or decelerate toward the target speed). In another embodiment, each positive determination may be weighted in the decision of whether or not the motor vehicle should adjust its speed, and if so, at what rate.

In either case, when it is determined that the motor vehicle should not adjust its speed, the step of providing the control signals to cause the motor vehicle to accelerate or decelerate may be bypassed (i.e., blocks 218, 220, and 222 are bypassed), and the method may iterate as shown, in an embodiment Embodiments of the method of performing cruise control described above may end at any stage upon the occurrence of a terminating event. For example, a terminating event may include the receipt of an indication that the cruise control function should be deactivated, where this indication may be produced by a user interface subsystem (e.g., user interface subsystem 110, FIG. 1) in response to the manipulation, by the driver, of one or more apparatus associated with the user interface subsystem. Other terminating events may include, for example, detection of the motor vehicle slowing below a threshold speed, the motor vehicle stopping or being turned off, and/or detection of the application of the brakes, for example.

As the above description indicates, an embodiment of a cruise control system may determine whether or not to accelerate or decelerate (and if so, a plan for implementing the acceleration or deceleration) toward a target speed based on the geographical location of the motor vehicle and information relating to features of a route which the motor vehicle is following (or potential routes which the motor vehicle may follow). Under certain circumstances, implementation of an embodiment of the cruise control system may provide for increased safety, and/or improved driver comfort, and/or improved fuel economy. For example, with regard to increased safety and/or improved driver comfort, an embodiment may cause the motor vehicle to avoid accelerating (even when the vehicle's speed is less than the target speed) toward a slower-moving motor vehicle traveling ahead of the motor vehicle and within a pre-determined distance from the motor vehicle. Embodiments also may cause the motor vehicle to avoid accelerating into a portion of a roadway having a speed limit that is lower than the target speed, into a curve or turn at which a speed lower than the target speed is warranted, into a construction zone, into an area in which an accident or other transient anomaly is present, into an area of inclement weather or hazardous driving conditions (e.g., roadway ice), and/or toward a stop sign or a traffic light that is predicted to be red upon arrival. For other examples, an embodiment may cause the motor vehicle to avoid decelerating (even when the vehicle's speed is greater than the target speed) when a faster-moving motor vehicle is traveling behind the motor vehicle and is located within a pre-determined distance from the motor vehicle (e.g., to reduce a likelihood of a rear-end collision).

With regard to improved fuel economy, an embodiment may cause the motor vehicle to avoid accelerating (even when the vehicle's speed is less than the target speed) into a declining portion of a roadway where gravity may cause the motor vehicle to accelerate toward or beyond the target speed. In such a case, an embodiment enables the motor vehicle to avoid expending its own energy (e.g., fuel) to accelerate, and also may avoid the occurrence or magnitude of instances when gravity causes the motor vehicle to accelerate beyond the target speed (thus avoiding or minimizing the expenditure of additional energy to slow down the motor vehicle). Similarly, an embodiment may cause the motor vehicle to avoid decelerating (even when the vehicle's speed is greater than the target speed) into an inclining portion of a roadway where gravity may cause the vehicle to decelerate. In this case, an embodiment enables the motor vehicle to avoid expending its own energy (e.g., energy associated with engine or mechanical braking) to decelerate. In areas of hilly or mountainous terrain, implementation of an embodiment may result in a substantial increase in fuel economy.

Figure 3:
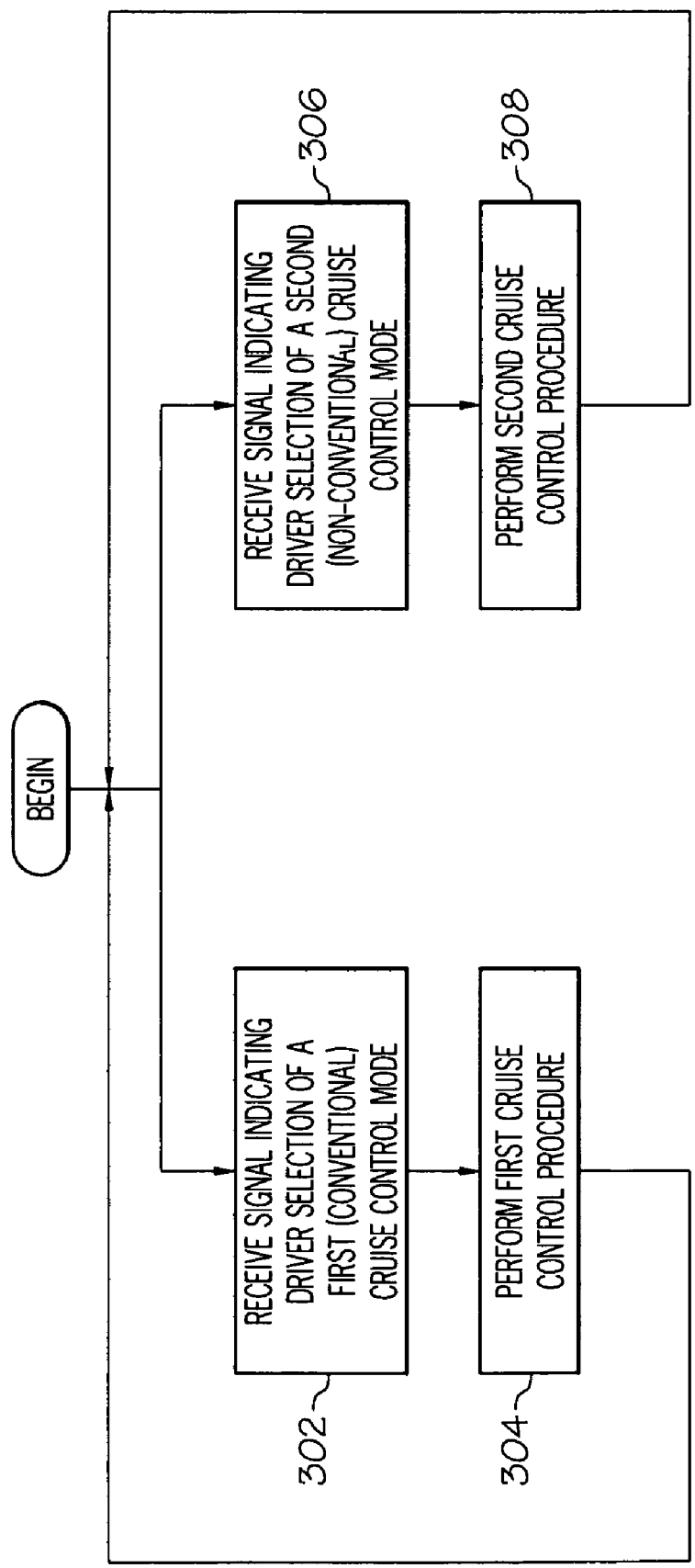
FIG. 3 is a flowchart of a method for performing cruise control in a motor vehicle, in accordance with another embodiment.

FIG. 3 is a flowchart of a method for performing cruise control in a motor vehicle, in accordance with another embodiment. As mentioned previously, a motor vehicle may be adapted to provide multiple cruise control "modes," where different cruise control procedures are performed in conjunction with each different mode. For example, one cruise control procedure may include performing some or all of the steps described in conjunction with the cruise control method of FIG. 2. Another cruise control procedure (e.g., associated with another cruise control mode) may include performing other, different steps. In an embodiment, the cruise control mode that is implemented at any given time is selectable by a driver of the motor vehicle.

Accordingly, the method may begin, in block 302, by receiving (e.g., by the processing and control subsystem) a first signal from a user interface (e.g., user interface subsystem 110, FIG. 1) indicating that a driver of the motor vehicle has selected a first option of performing a first cruise control procedure (e.g., the driver has selected a first cruise control mode). In conjunction with producing the first signal, the user interface may provide one or more user-selectable prompts (e.g., via a display device). Alternatively, the user interface may include a switchable device having multiple switch settings. A first setting may correspond to the first cruise control mode, and when the switchable device is configured in the first setting and the driver activates the cruise control functionality, the user interface may produce the first signal.

In response to receiving the first signal (i.e., in block 302), the method may continue, in block 304, by performing the first cruise control procedure. The first cruise control procedure may be adapted to maintain a target speed for the motor vehicle based on differences between the target speed and actual vehicle speeds of the motor vehicle in a conventional manner. Accordingly, performing the first cruise control procedure may include various steps that are analogous to steps discussed in conjunction with FIG. 2. These steps may include, for example, steps associated with block 204 (receive target speed indication), block 206 (receive actual speed indication), block 208 (determine whether (target speed−actual speed)>threshold), block 220 (provide control signals to cause the motor vehicle to accelerate or decelerate), and block 222 (determine whether the actual speed approximately equals the target speed). Performing the first cruise control procedure may continue until the cruise control functionality is deactivated, or until a different cruise control mode is selected.

As an alternative to selecting the first cruise control mode, in block 308, a second signal from the user interface may be received (e.g., by the processing and control subsystem), which indicates that the driver has selected a second option of performing a second cruise control procedure (e.g., the driver has selected a second cruise control mode). In conjunction with producing the second signal, and as described above, the user interface may provide one or more user-selectable prompts. Alternatively, the user interface may include a switchable device having multiple switch settings. A second setting may correspond to the second cruise control mode, and when the switchable device is configured in the second setting and the driver activates the cruise control functionality, the user interface may produce the second signal.

In response to receiving the second signal (i.e., in block 306), the method may continue, in block 308, by performing the second cruise control procedure. According to an embodiment, the second cruise control procedure is associated with the second cruise control mode, and the second cruise control procedure is different from the first cruise control procedure (i.e., it includes at least some different steps). The second cruise control procedure may be adapted to maintain a target speed for the motor vehicle based on differences between the target speed and actual vehicle speeds of the motor vehicle in a non-conventional manner.

Performing the second cruise control procedure may include various steps that are analogous to steps discussed in conjunction with FIG. 2. These steps may include, for example, steps associated with block 204 (receive target speed indication), block 206 (receive actual speed indication), block 208 (determine whether (target speed−actual speed)>threshold), block 210 (receive signals from external infrastructure component(s)), block 212 (determine geographical location), block 214 (receive information relating to features of a route, blocks 216 and 218 (determine whether the motor vehicle should accelerate or decelerate and, if so, at what rate and using what vehicle subsystems), block 220 (provide control signals to cause the motor vehicle to accelerate or decelerate), and block 222 (determine whether the actual speed approximately equals the target speed). Performing the second cruise control procedure may continue until the cruise control functionality is deactivated, or until a different cruise control mode is selected.

According to an embodiment, implementation of the second cruise control procedure is adapted to result in a higher fuel economy than the first speed control procedure. More particularly, as described above, implementation of the second cruise control procedure may cause the motor vehicle to avoid accelerating (even when the vehicle's speed is less than the target speed) into a declining portion of a roadway where gravity may cause the motor vehicle to accelerate toward or beyond the target speed. In addition or alternatively, implementation of an embodiment may cause the motor vehicle to avoid decelerating (even when the vehicle's speed is greater than the target speed) into an inclining portion of a roadway where gravity may cause the vehicle to decelerate.

In addition or alternatively, under certain circumstances, implementation of an embodiment of the cruise control system may provide for increased safety and/or improved driver comfort. For example, as described above, an embodiment may cause the motor vehicle to avoid accelerating (even when the vehicle's speed is less than the target speed) toward a slower-moving motor vehicle traveling ahead of the motor vehicle, into a portion of a roadway having a speed limit that is lower than the target speed, into a curve or turn at which a speed lower than the target speed is warranted, into a construction zone, into an area in which an accident or other anomaly is present, into an area of inclement weather or hazardous driving conditions, and/or toward a stop sign or a traffic light that is predicted to be red upon arrival. For other examples, an embodiment may cause the motor vehicle to avoid decelerating (even when the vehicle's speed is greater than the target speed) when a faster-moving motor vehicle is traveling behind the motor vehicle.

The foregoing description may refer to system components, elements, nodes or features being "coupled" together. As used herein, unless expressly stated otherwise, the term "coupled" means that one component/element/node/feature is directly or indirectly joined to (or directly or indirectly communicates with) another component/element/node/feature, and not necessarily mechanically. Thus, although the schematics shown in the figures depict various exemplary arrangements of components/elements/nodes/features, additional intervening components, elements, nodes, features, or devices may be present in other embodiments.

While various embodiments of systems and methods have been presented in the foregoing detailed description, it should be appreciated that a vast number of other variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing the exemplary embodiment or exemplary embodiments. It should be understood that various changes can be made in the function and arrangement of elements without departing from the scope of the inventive subject matter as set forth in the appended claims and the legal equivalents thereof.

What is claimed is:

1. A method for performing cruise control in a motor vehicle, the method comprising the steps of: determining a route which the motor vehicle is following; receiving signals from at least one external infrastructure component; determining a geographical location along the route of the motor vehicle based on the signals; determining an upcoming geographical feature based on the geographical location along the route of the motor vehicle; determining at least one of an acceleration plan and a deceleration plan based on the upcoming geographical feature; receiving information relating to features of the route which the motor vehicle is following from a vehicle-to-infrastructure communication system interface; wherein the determining the upcoming geographical feature is based on the information relating to the features; and performing a cruise control procedure to adjust the speed of the vehicle based on the at least one of the acceleration plan and the deceleration plan.

2. The method of claim 1, wherein the at least one external infrastructure component includes at least one global positioning system satellite, and wherein determining the geographical location comprises:
determining the geographical location of the motor vehicle based on the signals using a geometric trilateration technique.

3. The method of claim 1, wherein, the determining the at least one of the acceleration plan and the deceleration plan comprises determining an acceleration plan, and wherein the acceleration plan comprises:
providing a transmission control signal that causes the transmission to downshift to a lower gear; and
providing a throttle control signal that causes the throttle to increase airflow to the engine.

4. The method of claim 1, wherein, the determining the at least one of the acceleration plan and the deceleration plan comprises determining the deceleration plan, and wherein the deceleration plan comprises:
providing a throttle control signal that causes the throttle to decrease airflow to the engine.

5. The method of claim 1, wherein the determining the geographical feature comprises determining a declining portion of a road;
and wherein the acceleration plan comprises:
when an actual speed is less than a target speed, and when the motor vehicle is not approaching the declining portion of the road, providing control signals to cause the motor vehicle to accelerate; and
when the motor vehicle is approaching the declining portion of the road, bypassing the providing the control signals.

6. The method of claim 1, wherein the determining the at least one of the acceleration plan and the deceleration plan comprises:
determining based on the upcoming feature whether the motor vehicle is approaching a portion of a road over which the motor vehicle should travel at a slower speed than a target speed or within which the motor vehicle should stop;
when an actual speed is less than the target speed, and when the motor vehicle is not approaching the portion of the road over which the motor vehicle should travel at the slower speed, determining the acceleration plan; and
when the motor vehicle is approaching the portion of the road over which the motor vehicle should travel at the slower speed, bypassing the determining the acceleration plan.

7. The method of claim 1, the determining the at least one of the acceleration plan and the deceleration plan comprises:
determining based on the upcoming feature whether the motor vehicle is approaching an inclining portion of a road;
when an actual speed is greater than a target speed, and when the motor vehicle is not approaching the inclining portion of the road, determining the acceleration plan; and
when the motor vehicle is approaching the inclining portion of the road, bypassing the determining the acceleration plan.

8. The method of claim 1, further comprising:
receiving information relating to features of the route which the motor vehicle is following from a position/navigation system; and
wherein the determining the upcoming geographical feature is based on the information relating to the features.

9. The method of claim 1, further comprising:
receiving information relating to one or more other motor vehicles proximate to the motor vehicle from a vehicle-to-vehicle communication system interface; and performing the cruise control procedure based on the information.

10. The method of claim 1, wherein the determining the at least one of the acceleration plan and the deceleration plan comprises determining a speed adjustment plan that includes a target speed adjustment rate; and the performing the cruise control procedure comprises performing the cruise control procedure by providing control signals that correspond to the target speed adjustment rate.

11. The method of claim 10, wherein determining the speed adjustment plan further comprises:

determining a set of vehicle subsystems that will be controlled in order to implement the target speed adjustment rate; and wherein performing the cruise control procedure comprises providing control signals that correspond to the target speed adjustment rate to the set of vehicle subsystems.

12. An apparatus for performing cruise control in a motor vehicle, the apparatus comprising:

a positioning system interface adapted to receive signals from at least one external infrastructure component; and a processing and control subsystem adapted to determine a route with which the motor vehicle is traveling, to determine a geographical location along the route of the motor vehicle based on the signals, to determine an upcoming geographical feature based on the geographical location along the route of the motor vehicle; to determine at least one of an acceleration plan and a deceleration plan based on the upcoming geographical feature; wherein the determining the upcoming geographical feature is based on the information relating to the features; and to performing a cruise control procedure to adjust the speed of the motor vehicle based on the at least one of the acceleration plan and the deceleration plan.

13. The apparatus of claim 12, further comprising:

at least one wireless interface adapted to receive information relating to features of a route which the motor vehicle is following; and wherein the processing and control subsystem is further adapted to determine the upcoming geographical feature based on the information relating to the features of the route.

* * * * *